United States Patent [19]

Jacocks

[11] 4,308,748
[45] Jan. 5, 1982

[54] ADAPTIVE AUTOMATIC WALL WIND TUNNEL

[75] Inventor: James L. Jacocks, Tullahoma, Tenn.
[73] Assignee: Aro, Inc., Tullahoma, Tenn.
[21] Appl. No.: 99,157
[22] Filed: Nov. 30, 1979
[51] Int. Cl.³ .............................................. G01M 9/00
[52] U.S. Cl. .................................. 73/147; 73/861.52
[58] Field of Search ......................................... 73/147

[56] References Cited

U.S. PATENT DOCUMENTS

| | | | |
|---|---|---|---|
| 3,104,680 | 9/1963 | Orlin | 73/147 X |
| 3,236,263 | 2/1966 | Holderer | 73/147 X |
| 3,552,202 | 1/1971 | Kroeger et al. | 73/147 |
| 3,853,003 | 12/1974 | Sorensen | 73/147 |

FOREIGN PATENT DOCUMENTS

| | | | |
|---|---|---|---|
| 2820439 | 11/1978 | Fed. Rep. of Germany | 73/147 |
| 619250 | 3/1949 | United Kingdom | 73/147 |
| 714169 | 8/1954 | United Kingdom | 73/147 |
| 587448 | 1/1978 | U.S.S.R. | 73/147 |

Primary Examiner—Daniel M. Yasich
Attorney, Agent, or Firm—Beveridge, DeGrandi, Kline & Lunsford

[57] ABSTRACT

An apparatus is disclosed for achieving interference-free fluid velocity distributions in the plane of the walls of a subsonic wind tunnel. Adjustable slats having longitudinal baffles therebetween make up the test section walls, excluding the ground plane, and extend upstream and downstream of the vehicle to be tested. Static pressure measurements along the centerline of each slat provide information that enables calculation of the slat contour required to achieve close matching of the streamlines within the tunnel to those occurring on the road.

9 Claims, 3 Drawing Figures

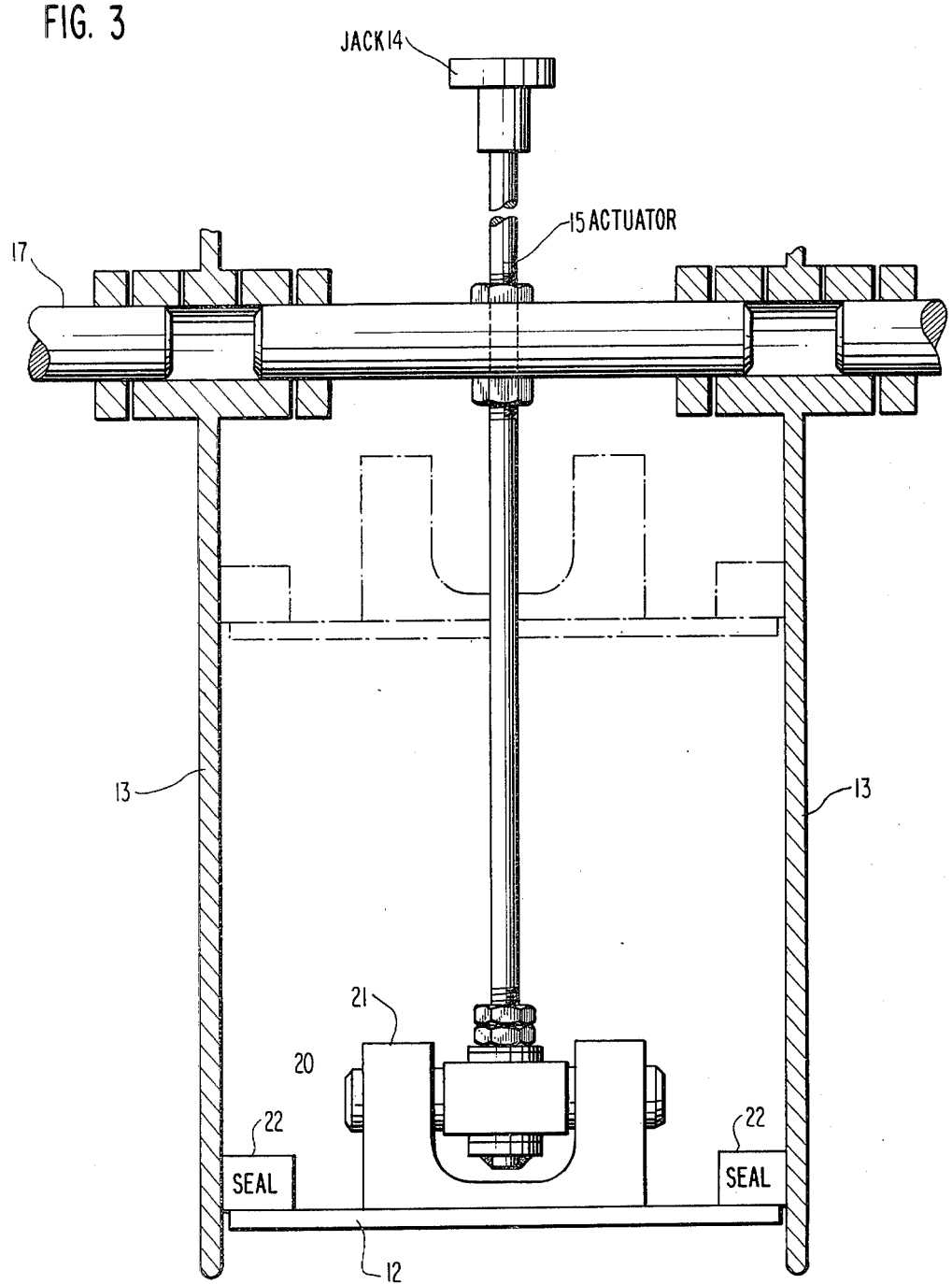

ADAPTIVE AUTOMATIC WALL WIND TUNNEL

BACKGROUND OF THE INVENTION

This invention relates to subsonic wind tunnels used for low speed aerodynamic and automotive testing and, more particularly, to an apparatus for attaining flow conditions within the test sections that are free of disturbances caused by the walls.

Current practice in designing automotive wind tunnels is to size the test section cross-sectional area to be nominally twenty times larger than the frontal area of the typical test vehicle. This sizing is necessary because the finite lateral extent of the wind tunnel flow generally results in deviations of the local flow over the vehicle, relative to that which would occur on the road. These deviations become unacceptably large if the tunnel walls are too close to the vehicle. However, if the test section walls were modified so that streamlines close to the wall were similar to those occurring on the road, then the test vehicle would be in an environment free of wall interference.

Kroeger, et al U.S. Pat. No. 3,552,202 attempts to attain the desired streamlines by providing transverse louvers which permit inflow at the test section boundary, but requires complex apparatus to achieve the effective outflow which is necessary for application to automotive testing. Other art for generating desired air speeds in two-dimensional flow is well known, supersonic wind tunnel nozzle contours being the most common example.

SUMMARY OF THE INVENTION

This invention yields an improved subsonic wind tunnel test section design such that large, bluff test articles may be tested in an environment practically free of wall interference.

Therefore, an object of this invention is to improve existing subsonic wind tunnels with emphasis on, but not limited to, the automotive-type wind tunnel to permit accurate testing of larger vehicles.

Another object is to reduce the size required of new wind tunnels, thereby reducing their cost while maintaining the same test data quality.

Another object is to provide an apparatus for controlling the streamline shapes at the test section boundary and to provide a process for attaining the singular set of streamlines which yield substantially interference-free flow.

Another object is to provide a method of correcting test data for residual wall interference effects.

The present invention achieves these and other objects by providing a wind tunnel test section for achieving a substantially interference-free velocity distribution in the plane of the walls and ceiling thereof when a test object is situated therein having an exterior support structure, a ground plane supporting the test object, longitudinal slats defining the walls and ceiling adjustably mounted on the support structure by a plurality of jacks along the length of the slats for adjusting the position of the slats relative to the support structure, and sensors mounted at a plurality of locations along the slats for sensing tunnel conditions at the sensor means, whereby the jacks may be actuated to adjust the position of the slats to achieve the substantially interference-free velocity distribution in response to conditions sensed by the sensor means.

BRIEF DESCRIPTION OF THE DRAWINGS

FIG. 3 is a transverse cross-section detailing a typical slat actuation mechanism, with a retracted position of the slat shown in phantom.

DESCRIPTION OF A PREFERRED EMBODIMENT

Figure 1:
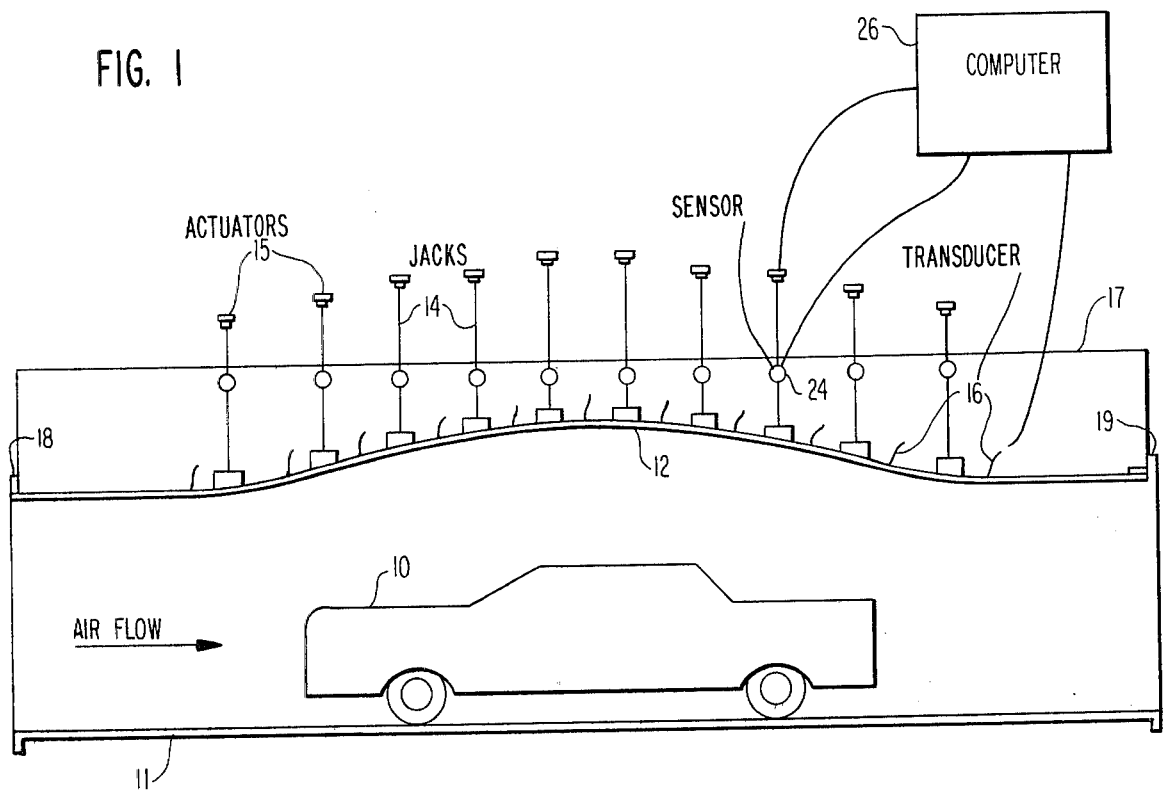
FIG. 1 is a longitudinal cross-sectional view, in schematic form, of an automotive wind tunnel test section embodying this invention.
Figure 2:
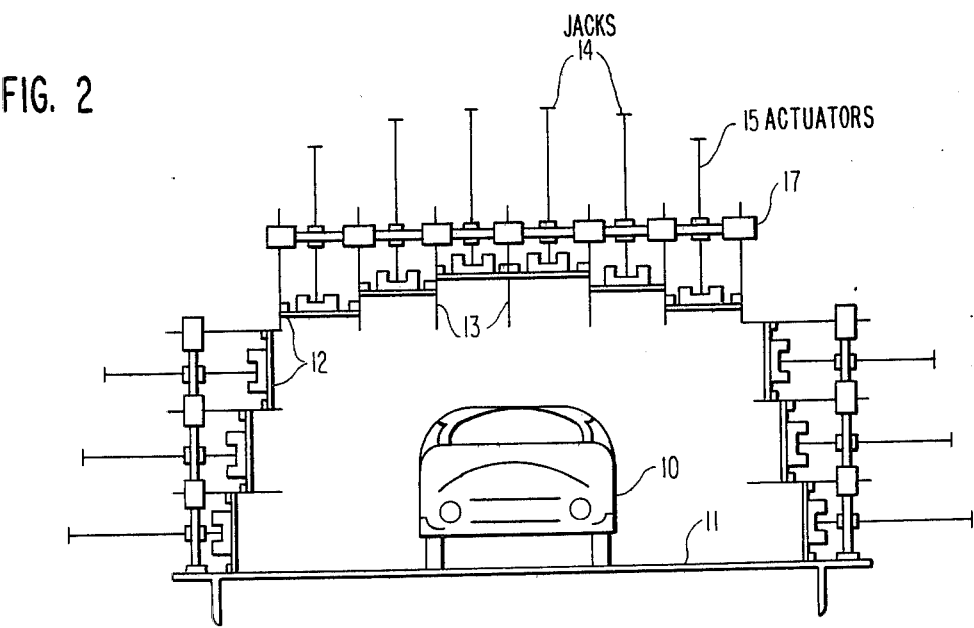
FIG. 2 is a transverse cross-sectional view, in schematic form, of the test section.

Referring to FIGS. 1 and 2, the wind tunnel test section contains the test vehicle 10 mounted on a conventional ground plane 11 with associated ordinary instrumentation for acquisition of data (not shown). The test section's walls other than the ground plane are made of flexible longitudinal slats 12 positioned between baffles 13. Slats 12 are mounted on support structure 17 by actuator jacks 14. It is understood that the number and location of slats and actuators can be changed by persons skilled in the art. The actuation mechanisms 15, for jacks 14 are shown in FIG. 2 as manually operable but can be mechanically operable under the control of computer 26 as in FIG. 1. Jacks 14 include a sensor 24 for the measurement of the slat position relative to support structure 17. Localized slat static pressure measurements are obtained by conventional pressure transducers 16 that serve as inputs to a computational process described below. The slats are constrained at the upstream end 18 and allowed free longitudinal movement at the downstream end 19.

Referring to FIG. 3, the jacks 14 are attached to the slats 12 through intermediate mechanisms 20 and 21 which permit jack actuation without imparting torque to the slat. Shaft 20, of course, is rotatably engaged in bearing 21. Leakage of air through the gap between slat and baffles is prevented by soft elastomer seals 22. The flow field disturbance generated by the model 10 is generally such that the pressure force across the slat 12 is inward, thereby forcing the seal 22 against the baffle 13 which serves as a wiper plate for the seal, as shown in FIG. 3.

The required slat contours for a given model configuration, attitude and test section velocity are calculated from sound engineering principles using the adaptive wall concept. This concept is also known to the art as "self-correcting", "self-streamlining", and "smart" wind tunnels. The static pressure measurements on the slats provide boundary condition information which enables calculation of a fictitious flow external to the tunnel. This calculation yields a theoretical estimate of the desired streamlines which is numerically related to the effective internal streamlines defined by the slat contours and viscous boundary layer growth corrections. The position of the slats can then be approximated to conform with the calculated estimate. Practically interference-free internal flow is obtained by adjusting the slat positions in accordance with the calculated estimate in iterative manner to make the measured internal flow attributes consistent with the calculated external flow. The iterative process can be interrupted at any point and the available information used to calculate the residual interference effects on the test vehicle. This attribute of the process could be applied to existing non-contourable wind tunnels.

What is claimed is:

1. A wind tunnel test section for achieving substantially interference-free velocity distributions in the planes of the walls and ceiling thereof when a test object is situated therein comprising a support structure external to said test section, a ground plane supporting said object, flexible longitudinal slats coacting with baffle means to define said walls and ceiling such that said walls and ceilings are substantially solid, each said slat adjustably mounted on said support structure by a plurality of jack means along the length of said slat for adjusting the position of said slat relative to said support structure, and transducer means mounted at a plurality of locations along said slats for sensing fluid flow conditions at said transducer means, whereby said jack means may be actuated to adjust the position of said slats to achieve said substantially interference-free velocity distribution in response to conditions sensed by said transducer means.

2. A wind tunnel test section as claimed in claim 1 wherein said transducer means comprises a static pressure transducer.

3. A wind tunnel test section as claimed in claim 2 wherein said baffle means are mounted on said support structure between adjacent ones of said longitudinal slats and substantially perpendicular to the plane thereof.

4. A wind tunnel test section as claimed in claim 3 further comprising elastomer seals mounted on the edges of said longitudinal slats adjacent said baffle means to provide substantially air-tight seals between said slats and said baffles.

5. A wind tunnel test section as claimed in claim 2 further comprising a sensor means for sensing the position of said slats.

6. A wind tunnel as claimed in claim 5 further comprising computation means for computing the appropriate actuation of said jack means responsive to the output of said pressure tranducers and said sensor means.

7. A method of operating a wind tunnel having an exterior support structure, flexible longitudinal slats adjustably mounted on said support structure by a plurality of actuable jack means along the length of said slats for adjusting the position of said slats relative to said support structure, baffle means mounted on said support structure and coacting with said slats to define substantially solid walls and ceiling, a ground plane having a test object mounted thereon, pressure transducers mounted along said slats for measuring the static pressure at said transducers, and position sensors for sensing the position of said slats comprising the steps of initially approximating the proper position of said slats to conform with desired streamline conditions in said tunnel, actuating said jacks to position said slats in said approximated proper position, measuring the static pressure at said pressure transducers and sensing the position of said slats, reapproximating the proper position of said slats from said pressure measurements and said slat positions; and reactuating said jacks in accordance with the results of said reapproximation.

8. A method as claimed in claim 7 further comprising additional steps of approximating, measuring and actuating in iterative manner until a substantially interference-free fluid velocity distribution is achieved along said slats.

9. A method as claimed in claim 7 further comprising an additional measuring step and the step of calculating the fluid flow interference effect on a test object due to nonstreamlined fluid velocity distributions along said slats.

* * * * *